United States Patent [19]

Olson et al.

[11] Patent Number: 4,626,161
[45] Date of Patent: Dec. 2, 1986

[54] PRE-ASSEMBLED TURNTABLE MOUNTING UNIT FOR A STORAGE STRUCTURE

[75] Inventors: George E. Olson, Arlington Heights; Jerry F. Nobiling, McHenry, both of Ill.

[73] Assignee: A. O. Smith Harvestore Products, Inc., Arlington Heights, Ill.

[21] Appl. No.: 663,771

[22] Filed: Oct. 23, 1984

Related U.S. Application Data

[63] Continuation-in-part of Ser. No. 360,799, Mar. 22, 1982, abandoned.

[51] Int. Cl.⁴ .............................................. B65G 65/46
[52] U.S. Cl. ................................... 414/308; 414/310
[58] Field of Search ............... 414/306, 307, 308, 309, 414/310, 311, 312; 104/35, 46

[56] References Cited

U.S. PATENT DOCUMENTS

| | | | |
|---|---|---|---|
| 3,338,176 | 8/1967 | Petersen | 104/35 |
| 3,367,519 | 2/1968 | Ferris et al. | 414/310 |
| 3,851,774 | 12/1974 | Laidig et al. | 414/307 |
| 4,386,695 | 6/1983 | Olson | 414/307 X |
| 4,436,473 | 3/1984 | Olson | 414/310 |

FOREIGN PATENT DOCUMENTS 2255237 7/1975 France .................................. 414/310

Primary Examiner—Robert J. Spar
Assistant Examiner—Ken Muncy
Attorney, Agent, or Firm—Andrus, Sceales, Starke & Sawall

[57] ABSTRACT

A pre-assembled turntable mounting unit for a storage structure. The storage structure is mounted on a foundation having a radial trough extending from the center of the structure to the exterior. A pre-assembled turntable mounting unit is disposed in the inner end of the trough at the center of the storage structure. The turntable mounting unit includes a fixed mounting ring which rests on the upper surface of the foundation bordering the trough and a plurality of angle-shaped roller support brackets are supported on the ring. A turntable, which supports the inner end of a rotatable sweep arm, is mounted for rotation on rollers carried by the roller brackets. By removing the anchor bolts the entire turntable mounting unit can be readily removed from the storage structure. The drive transmission that acts to rotate the sweep arm about its axis is mounted in a pre-established position on a platform suspended in the trough from the turntable mounting ring.

5 Claims, 9 Drawing Figures

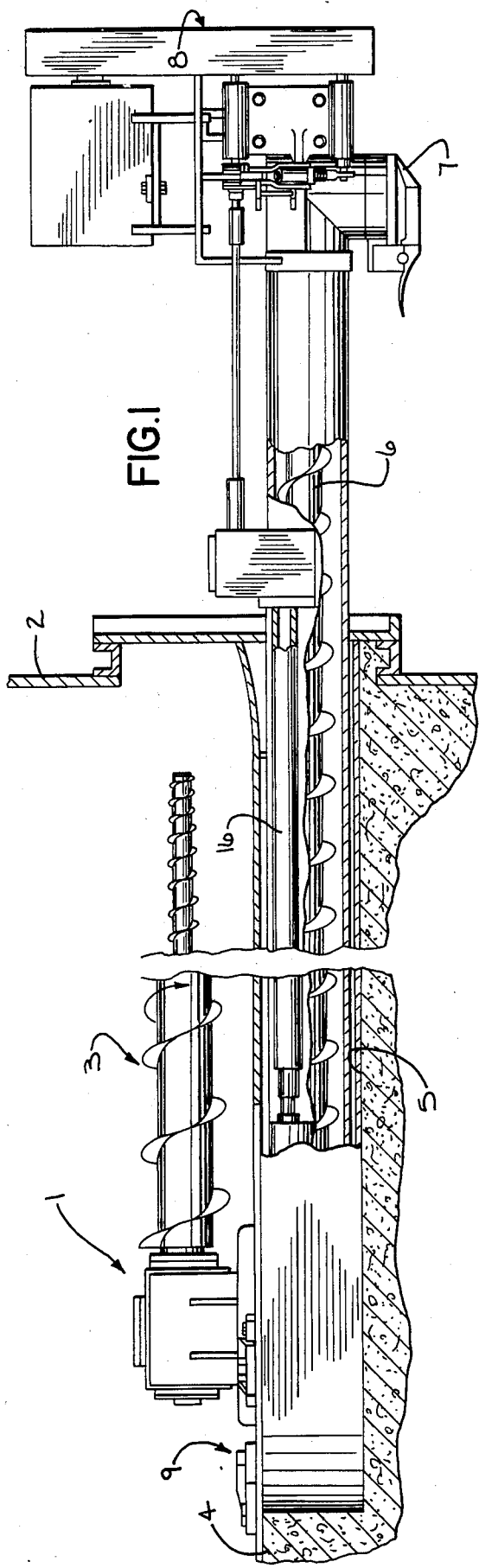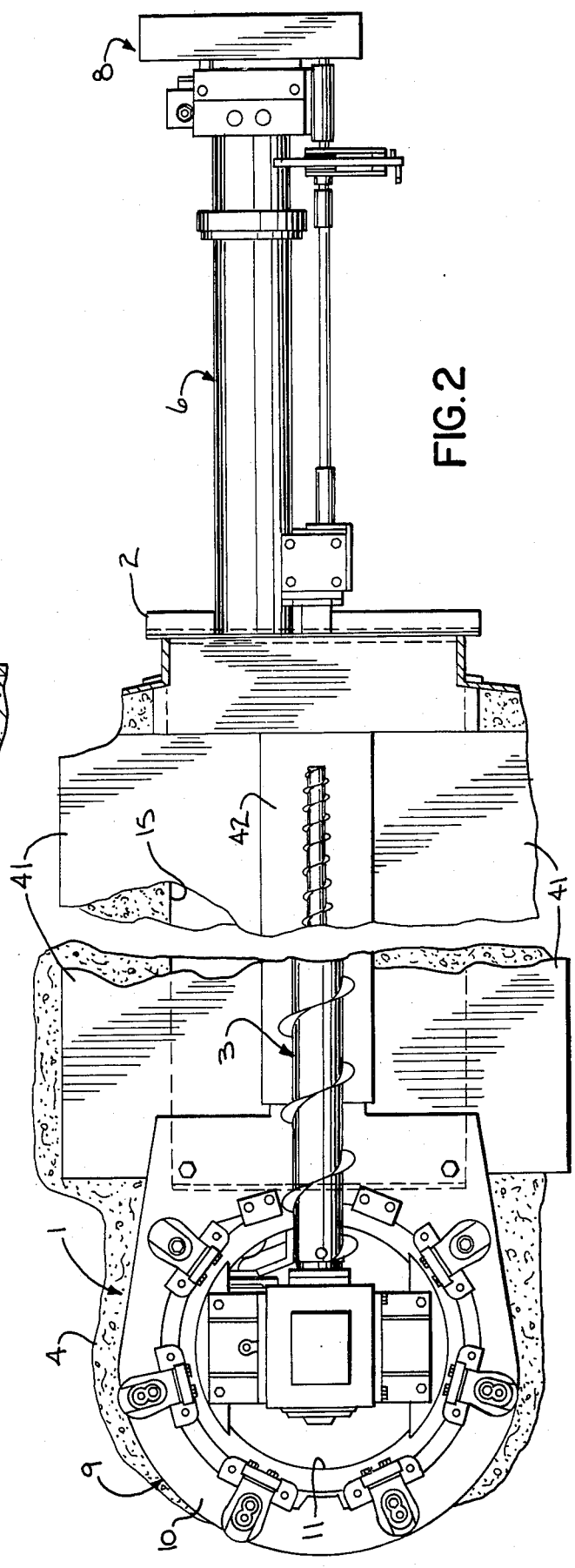

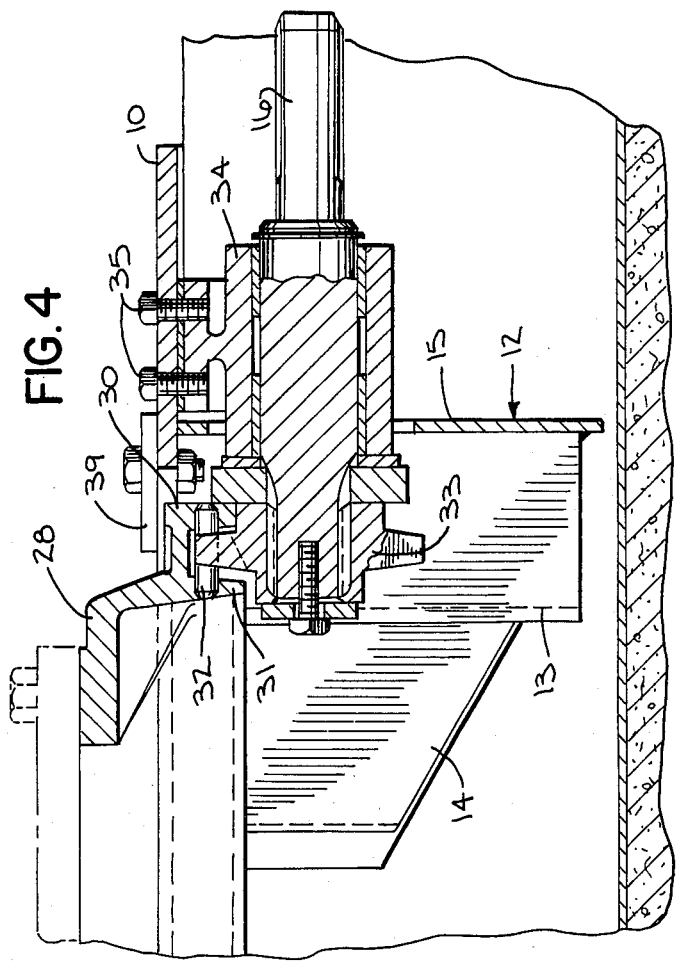
FIG.4
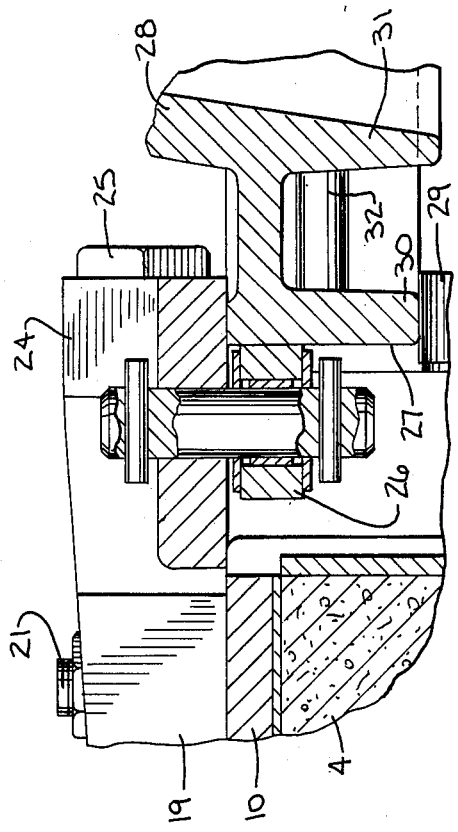
FIG.5
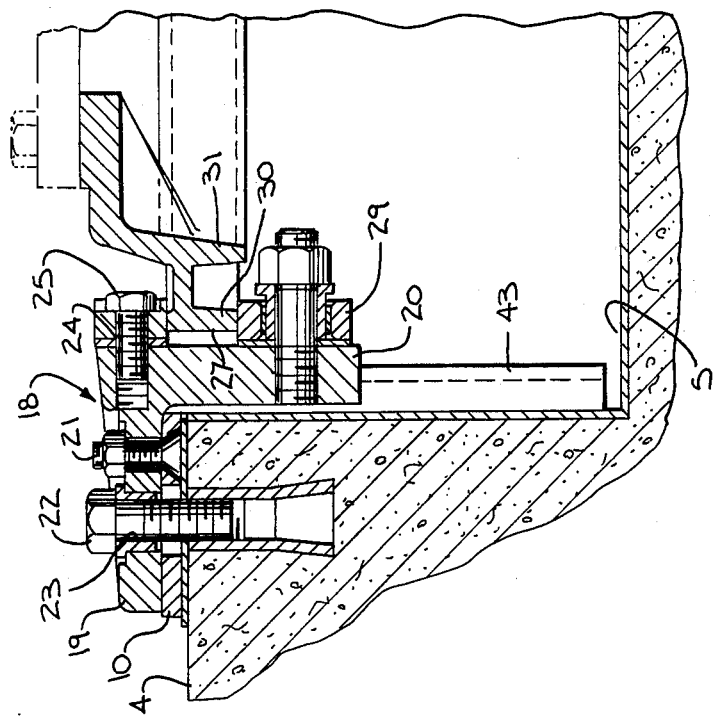

PRE-ASSEMBLED TURNTABLE MOUNTING UNIT FOR A STORAGE STRUCTURE

BACKGROUND OF THE INVENTION

This application is a continuation-in-part of application Ser. No. 06/360,799, filed Mar. 22, 1982 now abandoned.

Grain and other relatively free-flowing materials are frequently stored in air tight silos or storage structures and are unloaded from the bottom of the silo through use of a bottom unloader. The U.S. Pat. No. 4,386,695 discloses a bottom unloading mechanism including an auger-type sweep arm and is mounted to rotate about the center of the silo and undercut the stored material and convey it to the center of the silo where it is delivered to a discharge auger that operates in a radially extending trough in the silo foundation. In an unloader of that type, the inner end of the sweep arm is mounted on a turntable and is rotated in increments by a ratchet and pawl mechanism which interconnects a drive unit on the exterior of the silo with a drive shaft. The inner end of a drive shaft carries a sprocket that engages a series of drive elements on the turntable to rotate the turntable and the sweep arm around the silo.

In addition, rotation of the discharge auger is transmitted through a gear drive located in the inner end of the trough to the sweep arm, to thereby rotate the sweep arm about its axis, as it sweeps about the silo.

As disclosed in the aforementioned patent, the turntable is mounted for rotation on a series of roller brackets that are secured to the foundation bordering the trough. More particularly, the roller brackets are individually secured through anchor bolts to the vertical wall bordering the trough. Not only is the positon of attachment of the roller brackets in the somewhat inaccessible location, but the individual positioning and alignment of the brackets in order to properly journal the turntable is a difficult and time-consuming operation.

Storage structures of the type shown and described in the aforementioned patent are frequently used to store different types of products. For example, the storage structure during one season may be used to store freeflowing materials, such as grain, in which an auger-type sweep arm unloader is utilized. In other seasons the structure may be employed to store silage, in which a cutter chain type unloader is required. Therefore, it is advantageous to be able to readily install and remove the central turntable unit from the trough in order to use the different types of unloading mechanisms.

SUMMARY OF THE INVENTION

The invention is directed to a pre-assembled turntable mounting unit to be positioned in the inner end of the trough in the foundation of a storage structure. More specifically, the pre-assembled unit includes a ring which rests on the upper surface of the foundation bordering the inner end of the trough, and a series of roller support brackets are mounted on the ring. Each bracket includes a horizontal leg, which is secured through the ring to the foundation by an anchor bolt, and a vertical leg, which extends downwardly into the trough. Rollers are journaled on the vertical legs of the brackets and act to support the turntable for rotation.

To provide added strength and rigidity for the pre-assembled unit, a bulkhead is secured to the lower surface of the ring and extends transversely across the trough. Not only does the bulkhead provide added stiffness for the pre-assembled unit, bit it also aids in positioning the pre-assembled unit along the sides of the trough.

In addition, a nose extends downwardly from the ring and is positioned to engage the inner end of the trough as the pre-assembled unit is inserted into the trough. Engagement of the nose with the wall of the trough serves to accurately position the pre-assembled unit within the inner end of the trough.

As the turntable mounting unit is pre-assembled, it can be more quickly installed and removed from the trough. This feature makes the unit particularly adaptable for installations which store different types of materials and require different unloading mechanisms.

By pre-assembling the roller support bracket to the ring, the rollers are more precisely positioned as compared to an installation which requires individual placement of the rollers on the foundation.

In a modified form of the invention a mechanism is provided for more precisely aligning the gear box, which serves to rotate the sweep auger about its axis, with the turntable. In the past the turntable mounting assembly, which supports the turntable for rotation, has been mounted on the foundation adjacent the central portion of the trough, while the drive transmissions which rotates the sweep auger about its axis and includes an upper and lower gear box, had been separately mounted on the bottom of the trough. In order to properly align the gear boxes with the turntable, it has been the practice to manually adjust the position of the lower gear box both in a fore and aft and a lateral direction and then shim the lower gear box to provide the proper orientation of the drive shaft with the turntable. This installation procedure requires substantial time and labor and requires skilled operators to provide the necessary alignment.

In accordance with the invention, a platform is suspended from the turntable mounting plate by three adjustable legs. The lower gear box is mounted in a pre-established position on the platform and through proper adjustment of the legs, the gear box and drive shaft are properly oriented with respect to the turntable. Through use of the three point suspension platform, the installation of the drive mechanism is substantially simplified.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of a bottom unloading mechanism as mounted in a sealed silo or storage structure, with parts broken away in section;

FIG. 2 is a plan view of the structure shown in FIG. 1;

FIG. 4 is a section taken along line 4—4 of FIG. 3;

FIG. 5 is a section taken along line 5—5 of FIG. 3;

DESCRIPTION OF THE ILLUSTRATED EMBODIMENT

Figure 3:
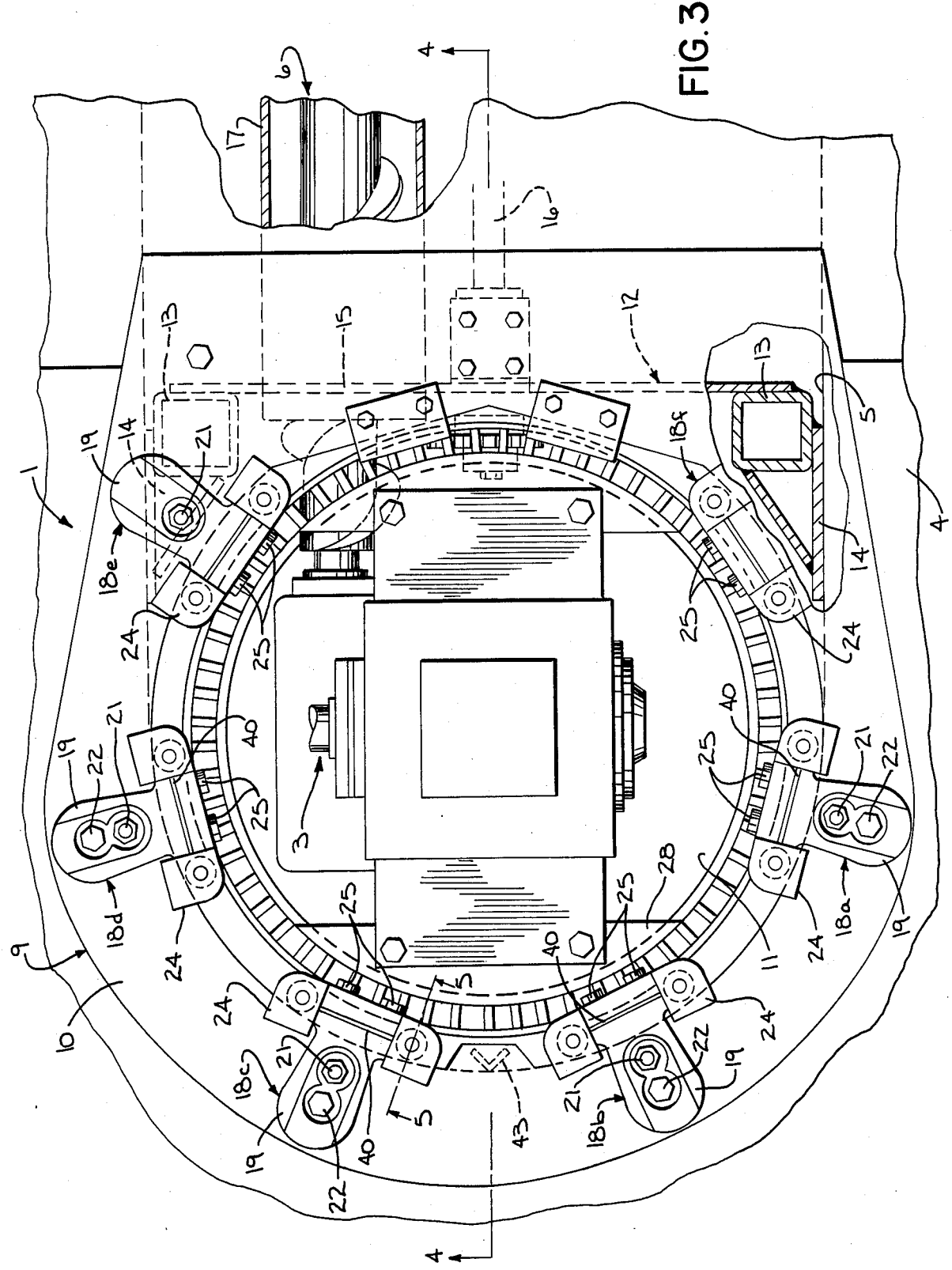
FIG. 3 is an enlarged plan view of the turntable mounting unit.
Figure 8:
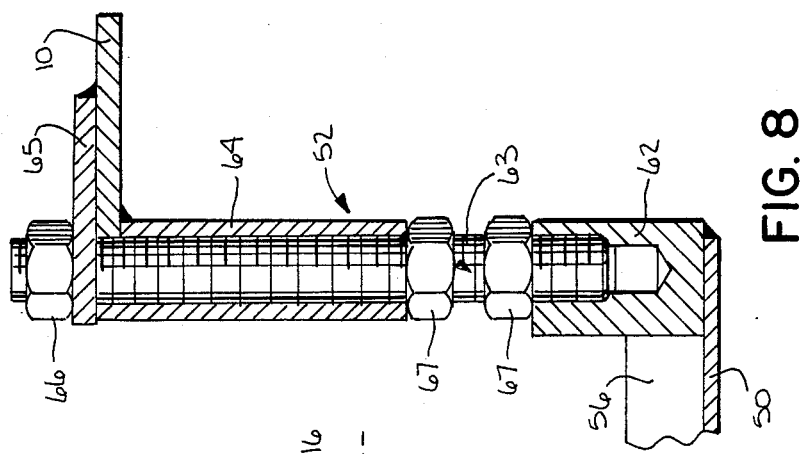
FIG. 8 is an enlarged vertical section of a supporting leg for the platform.
Figure 6:
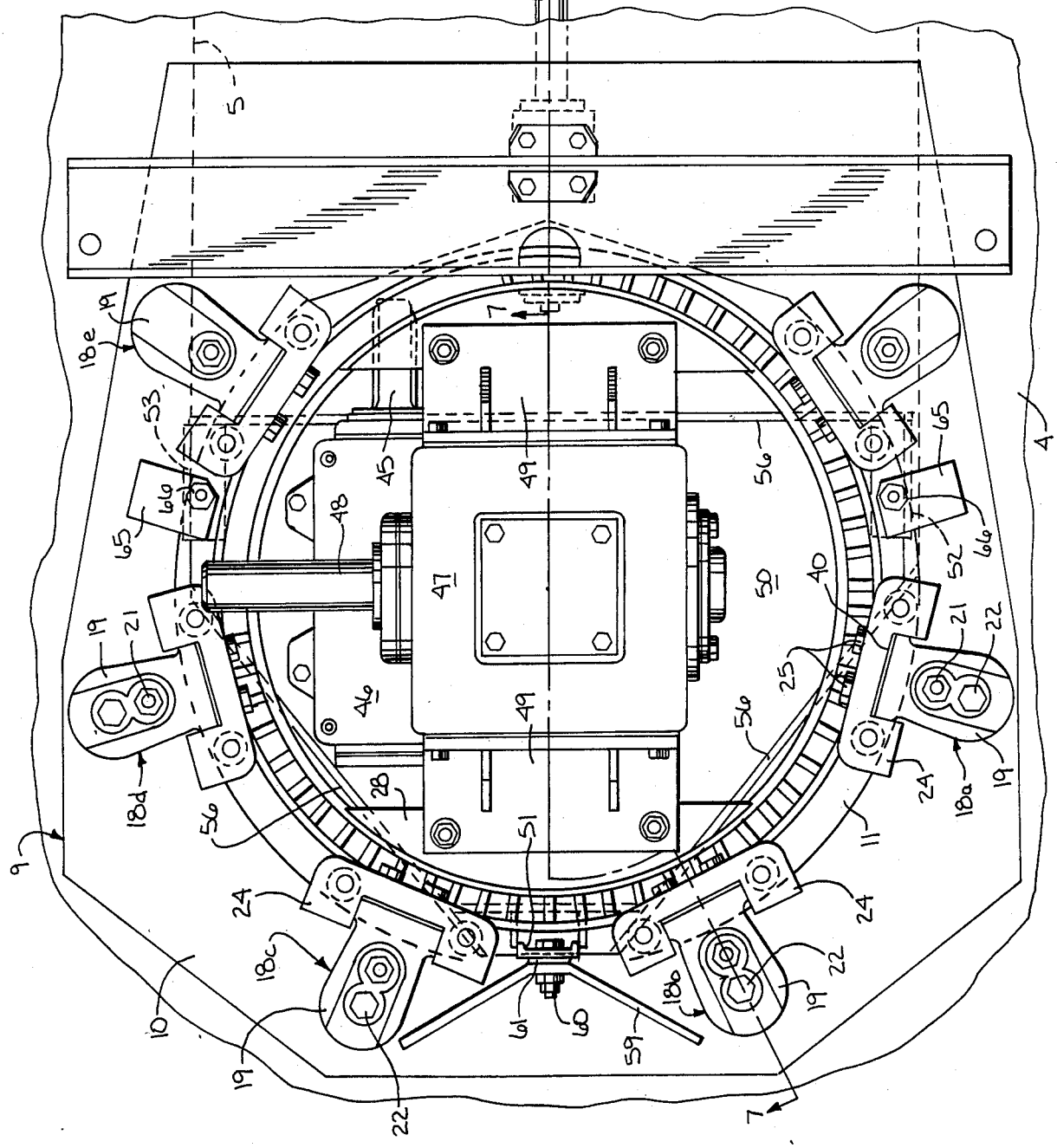
FIG. 6 is a plan view of a modified form of the invention in which the gear box is supported on a platform suspended from the turntable mounting ring.

FIGS. 1 and 2 illustrate a bottom unloading unit 1 which is disposed within a silo or storage structure 2 and is adapted to unload a relatively free-flowing material, such as grain from the structure.

The unloading unit 1, in general, includes a sweep auger 3 which is adapted to rotate about the center of the silo 2 and over the foundation 4 and dislodge the stored material and convey it to the center of the silo where it is delivered to the inner end of a radially extending trough 5 formed in foundation 4.

A discharge auger 6 operates within trough 5 and acts to convey the stored material through the trough to the exterior of the silo where it is discharged through the covered outlet 7.

A drive mechanism 8, similar to that disclosed in U.S. Pat. No. 4,386,695, is mounted on the end of the discharge auger 6 and operates to rotate the sweep auger 3 about the silo and also to rotate the discharge auger 6, which rotation, in turn is transmitted to rotate the sweep auger 3 about its axis. The drive mechanism 8 in itself is conventional and forms no part of the present invention.

In accordance with the invention, a pre-assembled turntable unit 9 is mounted in the inner end of the trough 5. The turntable unit 9 includes an annular plate or ring 10 which rests on the upper surface of the foundation 4 at the inner end of the trough. Ring 10 is provided with a central opening 11 which communicates with the inner end of trough 5.

A bulkhead 12 extends downwardly from the ring and is positioned radially outward of the central opening 11. As best shown in FIG. 3, bulkhead 12 includes a pair of vertically extending box sections 13 and side walls 14 extend radially from the box sections and are located within close proximity to the side walls of the trough 5, as shown in FIG. 3. In addition, transverse wall 15 connects the box sections 13 of bulkhead 12, and transverse wall 15 is provided with a pair of openings which receive the drive shaft 16 of the sweep auger drive and the tubular housing 17 of the discharge auger 6.

A plurality of generally L-shaped roller support brackets 18 are supported on ring 10 and brackets 18a-d are of identical structure, while roller brackets 18e and 18f are of somewhat different construction, as will be described hereinafter.

Each bracket 18 includes a horizontal leg 19 which overlies the ring 10 and a vertical leg 20 which extends downwardly within the trough 5. As best illustrated in FIG. 4, flat head bolts 21 extend through alinged openings in ring 10 and horizontal leg 19 of bracket 18 and serve to connect the brackets 18 to the plate 10.

Brackets 18a-d and ring 10 are mounted to the upper surface of foundation 4 through anchor bolts 22 which extend through aligned openings 23 in legs 19 and ring 10 and are anchored to the concrete foundation 4, as illustrated in FIG. 4.

As the horizontal legs 19 of brackets 18e and f do not override the foundation 4, the brackets 18e and f are secured to the plate 10 through the bolts 21, but are not anchored into the foundation 4.

A generally U-shaped member 24 is secured to each roller support bracket 18 by bolts 25. Each U-shaped member 24 carries a pair of rollers 26 which are located on either side of the corresponding bracket 18. As best shown in FIG. 5, the rollers 26 are adapted to ride against the outer surface 27 of turntable 28.

Turntable 28 is also supported for rotation by a plurality of rollers 29 each of which is carried by the vertical leg 20 of bracket 18, as shown in FIG. 4. The rollers 29 are adapted to ride against the lower end of the downwardly extending flange 30 of turntable 28.

Turntable 28 also includes a second downwardly extending flange 31 which is spaced radially inward from flange 30, and a plurality of pins 32 extend between the flanges 30 and 31 and serve as drive elements or teeth which are engaged by the teeth of a drive sprocket 33 mounted on shaft 16. As described in the aforementioned patent, rotation of the shaft 16 and sprocket 33 will rotate the turntable in steps or increments to thereby drive the sweep auger 3, which is carried by turntable 28, around the silo.

As best shown in FIG. 4, the shaft 16 is supported from the ring 10 by a hanger bracket 34 which is connected to the ring by screws 35.

As shown in FIG. 3, the turntable 28 is provided with a central opening 36 bordered by a pair of pads 37 on which the gear box 38 of the sweep auger 3 is mounted.

Hold-down plates 39 are bolted to the upper surface of ring 10 and extend over turntable 28, as shown in FIG. 4, to prevent the turntable from rising in the area along the longitudinal axis of trough 5.

In order to properly adjust the position of the rollers 26 one or more shims 40 can be inserted between the brackets 18 and members 24, as best shown in FIG. 3.

Floor plates 41 are recessed within the upper surface of the foundation 4 on either side of the trough 5, as shown in FIG. 2, and cover plates 42 bridge the gap between floor plates 41 and enclose trough 5.

Ring 10, roller support brackets 18 and bulkhead 12 are pre-assembled outside of the silo. The pre-assembled unit 9 is positioned in the inner end of trough 5 and in order to properly align the unit 9 within the trough, an angle-shaped nose 43 is secured to the undersurface of plate 10 and is located at the inner extremity of the trough. By engaging the nose 43 with the wall of the trough, the roller support brackets 18 will be properly aligned with respect to the end of the trough. With the nose 43 engaged with the trough end, the turntable unit 9 is adjusted laterally so that side walls 14 of bulkhead 12 are approximately equally spaced from the side walls of the trough. With turntable unit 9 properly positioned, anchor holes are then drilled in the concrete foundation using the holes 23 as a template. Anchor bolts 22 are then installed to securely mount the turntable unit 9 to the foundation 4.

The pre-assembled nature of the turntable unit 9 insures greater precision in mounting the roller support brackets and thereby reducing stress on the rollers and bearings during rotation of the sweep auger.

As the turntable unit is pre-assembled, it can be installed by merely drilling the anchor bolt holes and installing the anchor bolts. This greatly increases the speed of assembly and enables the unit to be readily removed from the trough in the event a different unloading mechanism is required.

FIGS. 6-9 illustrate a modified form of the invention in which the drive transmission for driving the sweep auger about its axis is carried by a platform suspended from the turntable mounting ring 10.

The sweep auger 3 is rotated about its axis by a drive mechanism as described in U.S. Pat. No. 4,386,695. In accordance with that drive mechanism, a drive shaft located in trough 5 and which is rotated by a motor located outside of the storage structure, is connected to the input shaft 45 of a lower gear box 46 and the output shaft of gear box 46 is connected through an upper gear box 47 to shaft 48, which in turn is coupled to sweep auger 3. Upper gear box 47 is provided with a pair of angle brackets 49 which are mounted by bolts to turntable 28. The lower end of upper gear box 47 extends through the central opening in turntable 28 and the lower gear box 46, as best seen in FIG. 7, is located beneath the level of turntable 28.

Figure 7:
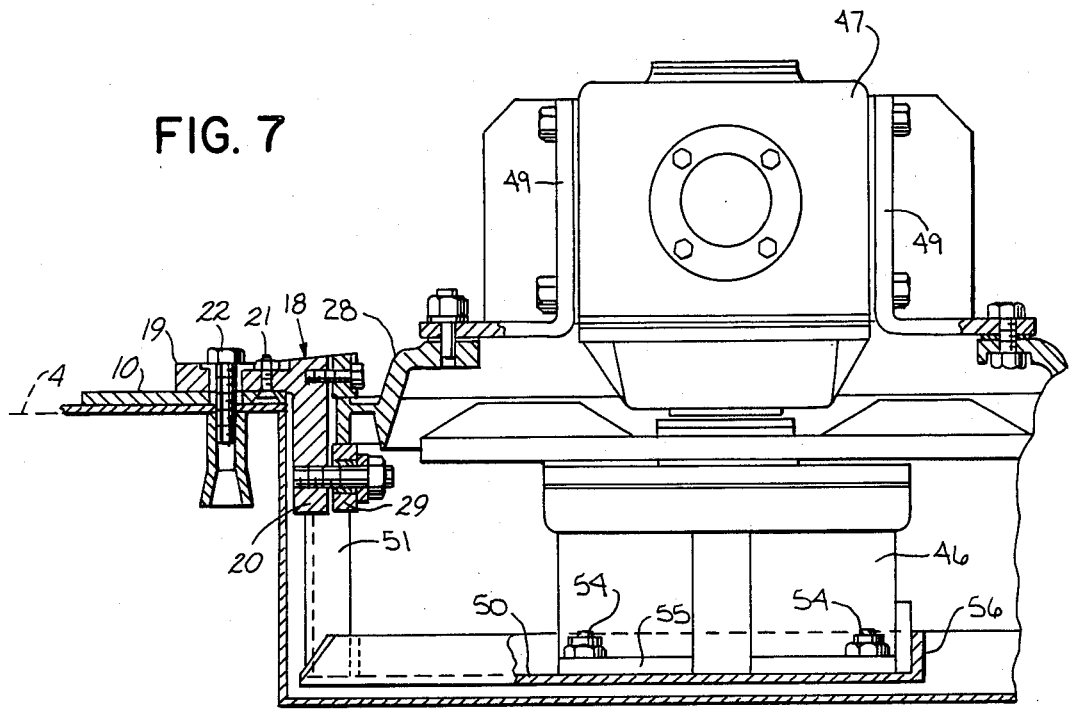
FIG. 7 is a section taken along line 7—7 of FIG. 6.

In accordance with the embodiment shown in FIGS. 6–9, a generally horizontal plate or platform 50 is suspended from the turntable mounting ring 10 through three legs 51, 52 and 53 and lower gear box 46 is mounted in a pre-established position on platform 50. In this regard a plurality of bolts 54 extend through pre-established holes in platform 50 and through aligned holes in the flanges 55 on gear box 46, as shown in FIG. 7. The bolted connection precisely positions the lower gear box 46 with respect to platform 50.

Figure 9:
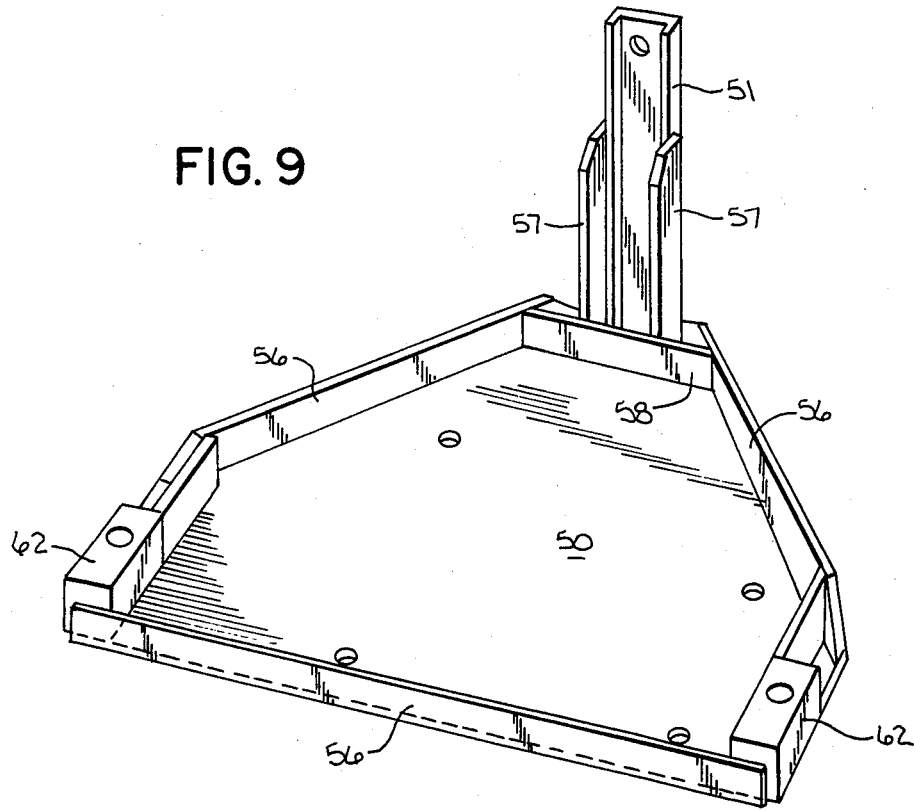
FIG. 9 is a perspective view of the platform.

As best seen in FIG. 9, the three sides of platform 50 are provided with upstanding flanges 56 and the rear side of the lower gear box 46 bears against the rear flange 56, as shown in FIG. 7.

The forward leg 51 of platform 50 is reinforced by a pair of vertical bars 57 which are welded to the side edges of leg 51. The lower ends of bars 57 are secured to a cross bar 58 which extends between the upwardly extending flanges 56 on two side edges of the platform 50.

The upper end of leg 51 is connected to the central portion of a V-bracket 59 which is mounted on the upper surface of ring 10. To provide this connection, a bolt 60 extends through aligned openings in leg 51 and V-bracket 59, and suitable shims 61 can be interposed between the leg and the bracket to properly position the platform 50 in a fore and aft direction.

Legs 52 and 53 are similar in construction and each leg includes a block 62 having a threaded bore which receives the lower end of a support rod 63. Rod 63 extends upwardly through a guide tube 64 which is mounted to the lower surface of mounting ring 10. A connecting plate 65 is secured to the upper surface of the ring 10 and guide rod 64 extends through an opening in the connecting plate and receives a nut 66. By threaded adjustment of rod 63 in the threaded bore in block 62, the vertical position of the side edges of the platform 50 can be adjusted as desired. Rods 63 are locked in position through use of lock nuts 67.

With the construction shown in FIGS. 6–9, the gear boxes are precisely mounted with respect to the turntable mounting plate 10 and turntable 28. After assembly of the turntable unit 9 and the interconnected platform 50 in the trough, the lower gear box 46 is mounted in a pre-established position on the platform 50. Upper gear box 47 is then bolted to turntable 28 and if minor adjustment is required to provide this connection, the adjustment can be made through threaded adjusting rods 63. Through the use of this construction, the installation of the drive mechanism is facilitated and this greatly reduces the cost of installation of the unloader.

Various modes of carrying out the invention are contemplated as being within the scope of the following claims particularly pointing out and distinctly claiming the subject matter which is regarded as the invention.

We claim:

1. In a storage structure, a vessel to contain a stored material, a foundation to support the vessel, said foundation having a trough extending from the center of the vessel to the exterior, a pre-assembled unit disposed in the trough adjacent the center of the vessel, said unit comprising a fixed ring supported on the upper surface of the foundation and having a central opening communicating with the inner end portion of the trough, an annular turnable having a central aperture, support means carried by said ring for supporting said turntable for rotation, a material dislodging member operably connected to the turntable, drive means operably connected to said turntable for rotating said turntable and thereby rotating said dislodging member around said vessel, drive transmission means operably connected to said dislodging member for rotating the dislodging member about its axis, said drive transmission means extending downwardly through said opening in said ring and through said aperture in said turntable, a platform suspended from said ring and spaced above the bottom of the trough, said drive transmission means being mounted in an established position on said platform, a plurality of legs interconnecting the platform with said ring for suspending said platform from said ring, and adjusting means operably connected to at least one of said legs for adjusting the length of said leg to align said drive transmission means with said turntable and said ring.

2. The structure of claim 1, wherein said platform is provided with a plurality of pre-established mounting holes aligned with corresponding holes in said drive transmission means, said structure including fastening means extending through said aligned holes to secure the drive transmission means to said platform.

3. The structure of claim 1, and wherein said plurality of legs comprises three legs.

4. The structure of claim 3, wherein said trough has an inner end located adjacent the center of the storage structure a first of said legs being located at the said inner end of said trough, said structure including a bracket secured to said ring, said first leg being secured to said bracket.

5. The structure of claim 4, wherein said second and third legs include an adjustable length connector connecting said platform with said ring.

* * * * *